(12) United States Patent
Mehrotra et al.

(10) Patent No.: US 11,277,421 B2
(45) Date of Patent: Mar. 15, 2022

(54) SYSTEMS AND METHODS FOR DETECTING AND THWARTING ATTACKS ON AN IT ENVIRONMENT

(71) Applicant: Citrix Systems, Inc., Fort Lauderdale, FL (US)

(72) Inventors: Mudit Mehrotra, Bangalore (IN); Vipin Borkar, Bangalore (IN); Vikramjeet S. Sandhu, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 358 days.

(21) Appl. No.: 15/900,032

(22) Filed: Feb. 20, 2018

(65) Prior Publication Data

US 2019/0260777 A1 Aug. 22, 2019

(51) Int. Cl.
*H04L 29/06* (2006.01)
*G06F 21/31* (2013.01)
*G06F 21/57* (2013.01)

(52) U.S. Cl.
CPC ........ *H04L 63/1425* (2013.01); *G06F 21/316* (2013.01); *G06F 21/577* (2013.01); *H04L 63/08* (2013.01); *H04L 63/107* (2013.01); *H04L 63/1416* (2013.01); *H04L 63/1433* (2013.01); *G06F 2221/2111* (2013.01)

(58) Field of Classification Search
None
See application file for complete search history.

(56) References Cited

U.S. PATENT DOCUMENTS

| | | | |
|---|---|---|---|
| 7,243,226 B2* | 7/2007 | Newcombe | G06Q 20/3674 709/225 |
| 8,544,060 B1* | 9/2013 | Khetawat | H04L 63/20 713/165 |
| 8,918,867 B1* | 12/2014 | Salour | G06F 21/6245 726/22 |

(Continued)

OTHER PUBLICATIONS

Bakar Khairul Azmi Abu, et al, "Adaptive authentication: Issues and Challenges," 2013 World Congress on Computer and Information Technology (WCCIT), IEEE, Jun. 22, 2013, pp. 1-6, XP032494879.

(Continued)

*Primary Examiner* — Michael W Chao
(74) *Attorney, Agent, or Firm* — Fox Rothschild, LLP; Robert Sacco; Carol Thorstad Forsyth

(57) ABSTRACT

Systems and methods for detecting and thwarting attacks on a computing system. The methods comprise: collecting timestamped data from different software products comprising a unified end point management product, an SBC/ADV product, an application delivery controller product, a content collaboration product, and/or a software defined WAN product; analyzing the collected timestamped data to determine if an observed user behavior matches a learned normal user behavior of an authorized user associated with a user account; determining a risk classification level associated with a credential used by a user to log into the user account, when the observed user behavior does not match the learned normal user behavior of the authorized user; and causing at least one security related action to be performed when the risk classification level is greater than a threshold level or the risk classification level is one of a top N highest risk classification levels.

15 Claims, 5 Drawing Sheets

(56) References Cited

U.S. PATENT DOCUMENTS

| | | | |
|---|---|---|---|
| 9,143,529 B2* | 9/2015 | Qureshi | H04L 67/10 |
| 9,401,925 B1* | 7/2016 | Guo | H04L 63/1416 |
| 9,516,053 B1* | 12/2016 | Muddu | G06N 5/04 |
| 9,565,212 B2* | 2/2017 | Faltyn | H04W 12/06 |
| 9,680,938 B1* | 6/2017 | Gil | H04L 67/22 |
| 9,800,605 B2* | 10/2017 | Baikalov | H04L 63/1408 |
| 10,116,680 B1* | 10/2018 | Han | G06F 21/566 |
| 10,454,950 B1* | 10/2019 | Aziz | H04L 63/145 |
| 10,505,959 B1* | 12/2019 | Wang | H04L 63/1425 |
| 10,572,661 B2* | 2/2020 | Wu | G06F 21/554 |
| 10,594,714 B2* | 3/2020 | Crabtree | H04L 63/1425 |
| 10,599,857 B2* | 3/2020 | Kim | H04L 63/102 |
| 10,609,065 B2* | 3/2020 | Jones | H04L 63/1433 |
| 10,623,501 B2* | 4/2020 | Mathew | H04L 67/143 |
| 10,642,995 B2* | 5/2020 | Shih | H04L 67/22 |
| 10,693,897 B2* | 6/2020 | Jones | G06F 16/2474 |
| 10,701,093 B2* | 6/2020 | Dean | H04L 63/1425 |
| 10,701,094 B2* | 6/2020 | Kirti | H04W 12/086 |
| 10,715,543 B2* | 7/2020 | Jakobsson | H04L 63/1433 |
| 10,733,116 B2* | 8/2020 | Litichever | G06F 13/4282 |
| 10,735,446 B2* | 8/2020 | Cobb | G06N 20/00 |
| 10,757,122 B2* | 8/2020 | Vasudevan | H04L 67/10 |
| 10,771,263 B2* | 9/2020 | Smith | G06F 21/33 |
| 10,771,496 B2* | 9/2020 | Shtar | G06F 21/50 |
| 10,805,265 B2* | 10/2020 | Murthy | H04L 63/02 |
| 10,841,321 B1* | 11/2020 | Athavle | G06F 16/24575 |
| 10,867,034 B2* | 12/2020 | Martin | H04L 63/1433 |
| 10,915,643 B2* | 2/2021 | Ford | H04L 63/1408 |
| 11,057,362 B2* | 7/2021 | Segu | H04L 63/205 |
| 11,101,993 B1* | 8/2021 | Shahidzadeh | G06F 21/577 |
| 11,165,800 B2* | 11/2021 | Thampy | G06N 20/00 |
| 2002/0129264 A1* | 9/2002 | Rowland | H04L 63/102 726/26 |
| 2002/0144149 A1* | 10/2002 | Hanna | H04L 9/3263 726/5 |
| 2005/0188079 A1* | 8/2005 | Motsinger | G06F 21/55 709/224 |
| 2006/0107306 A1* | 5/2006 | Thirumalai | G06Q 20/26 726/1 |
| 2006/0206615 A1* | 9/2006 | Zheng | H04L 63/145 709/229 |
| 2006/0282660 A1* | 12/2006 | Varghese | G06Q 20/4016 713/155 |
| 2008/0263197 A1* | 10/2008 | Stephens | H04L 41/0622 709/224 |
| 2008/0263363 A1* | 10/2008 | Jueneman | G06F 21/32 713/184 |
| 2008/0271143 A1* | 10/2008 | Stephens | H04L 41/5061 726/22 |
| 2010/0094767 A1* | 4/2010 | Miltonberger | G06Q 10/067 705/325 |
| 2010/0162347 A1* | 6/2010 | Barile | G06F 21/552 726/1 |
| 2011/0238862 A1* | 9/2011 | Chaturvedi | H04L 63/0807 709/238 |
| 2011/0239306 A1* | 9/2011 | Avni | G06F 21/54 726/26 |
| 2012/0259740 A1* | 10/2012 | Webber | G06Q 30/0601 705/27.1 |
| 2013/0305357 A1* | 11/2013 | Ayyagari | H04W 12/06 726/22 |
| 2014/0074623 A1* | 3/2014 | Mohammadi | G06Q 30/0269 705/14.66 |
| 2014/0208419 A1* | 7/2014 | Chang | G06F 21/31 726/21 |
| 2014/0280625 A1* | 9/2014 | Byrd Vallieres de St. Real | H04L 67/22 709/206 |
| 2014/0282978 A1* | 9/2014 | Lerner | H04L 63/083 726/7 |
| 2015/0269386 A1* | 9/2015 | Khetawat | G06F 21/62 726/1 |
| 2015/0373043 A1* | 12/2015 | Wang | G06F 21/6254 706/12 |
| 2016/0105801 A1* | 4/2016 | Wittenberg | H04W 4/021 455/411 |
| 2016/0261616 A1* | 9/2016 | Shulman | H04L 63/1416 |
| 2016/0261621 A1* | 9/2016 | Srivastava | H04L 69/22 |
| 2016/0275277 A1* | 9/2016 | Huang | G06F 21/316 |
| 2016/0300074 A1* | 10/2016 | Huang | G06F 21/6245 |
| 2016/0306965 A1* | 10/2016 | Iyer | G06F 21/552 |
| 2017/0063897 A1* | 3/2017 | Muddu | G06N 5/022 |
| 2017/0063910 A1* | 3/2017 | Muddu | H04L 43/00 |
| 2017/0230417 A1 | 8/2017 | Amar et al. | |
| 2017/0244746 A1* | 8/2017 | Hawthorn | H04L 63/1433 |
| 2017/0264628 A1* | 9/2017 | Treat | H04L 63/1425 |
| 2018/0027006 A1* | 1/2018 | Zimmermann | H04L 63/0245 726/11 |
| 2018/0124082 A1* | 5/2018 | Siadati | G06N 5/047 |
| 2018/0139606 A1* | 5/2018 | Green | H04L 63/107 |
| 2018/0176253 A1* | 6/2018 | Koster | H04L 63/20 |
| 2018/0260567 A1* | 9/2018 | Ullom | G06F 21/57 |
| 2019/0044963 A1* | 2/2019 | Rajasekharan | H04W 12/67 |
| 2019/0138718 A1* | 5/2019 | Iyer | G06Q 10/105 |
| 2020/0036740 A1* | 1/2020 | Ford | H04L 67/306 |
| 2020/0042699 A1* | 2/2020 | Chari | G06F 21/552 |
| 2020/0097665 A1* | 3/2020 | Mahaffey | H04L 63/1433 |
| 2020/0097667 A1* | 3/2020 | Ford | G06F 21/604 |
| 2020/0358804 A1* | 11/2020 | Crabtree | H04L 63/102 |
| 2021/0157919 A1* | 5/2021 | Stockdale | H04L 63/1425 |
| 2021/0224401 A1* | 7/2021 | Marty | G06F 21/566 |
| 2021/0226963 A1* | 7/2021 | Marty | H04L 63/20 |
| 2021/0297425 A1* | 9/2021 | Ford | H04L 63/102 |

OTHER PUBLICATIONS

Extended European Search Reported dated Jul. 11, 2019 for EP 19156626.4.

\* cited by examiner

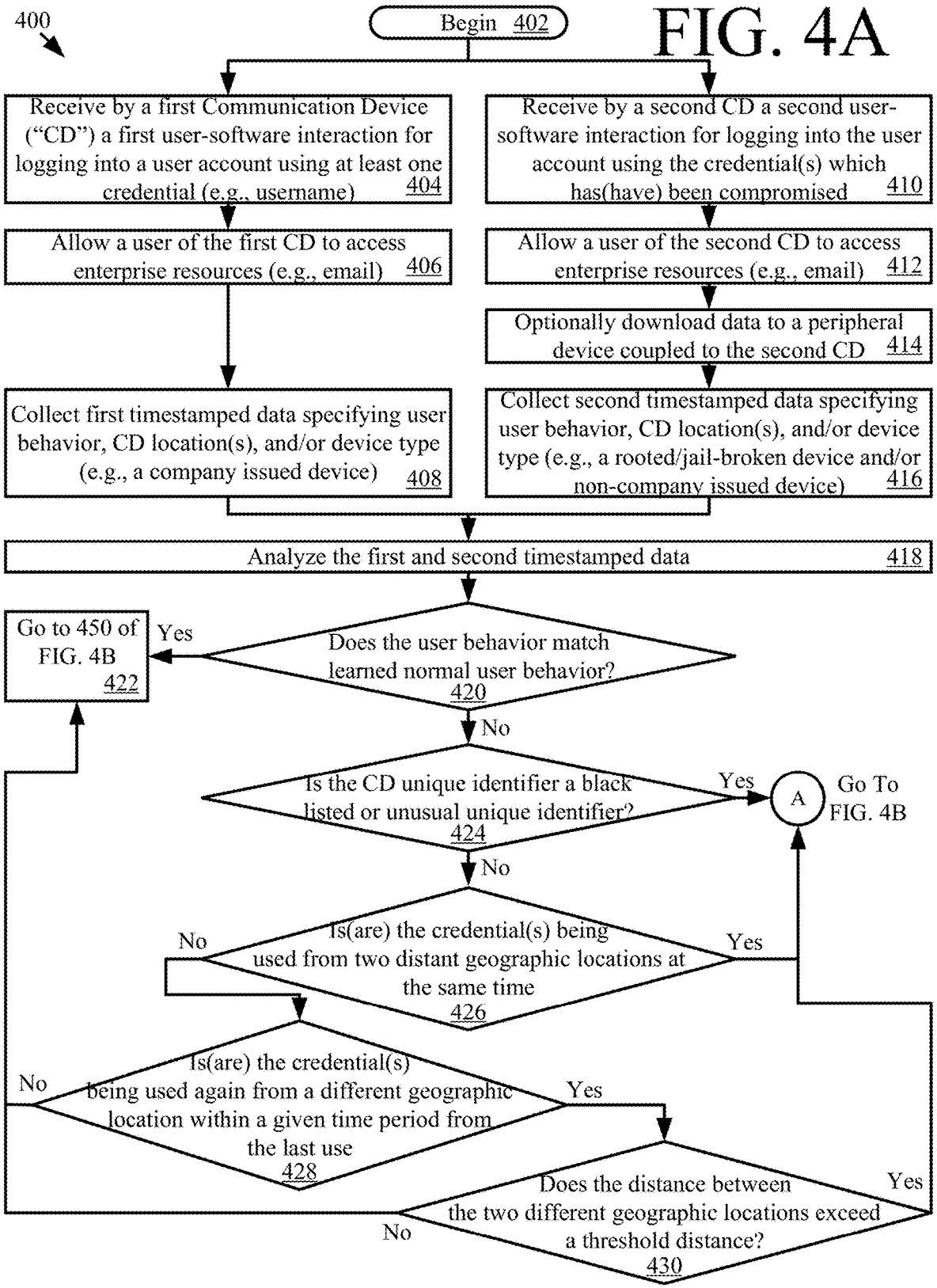

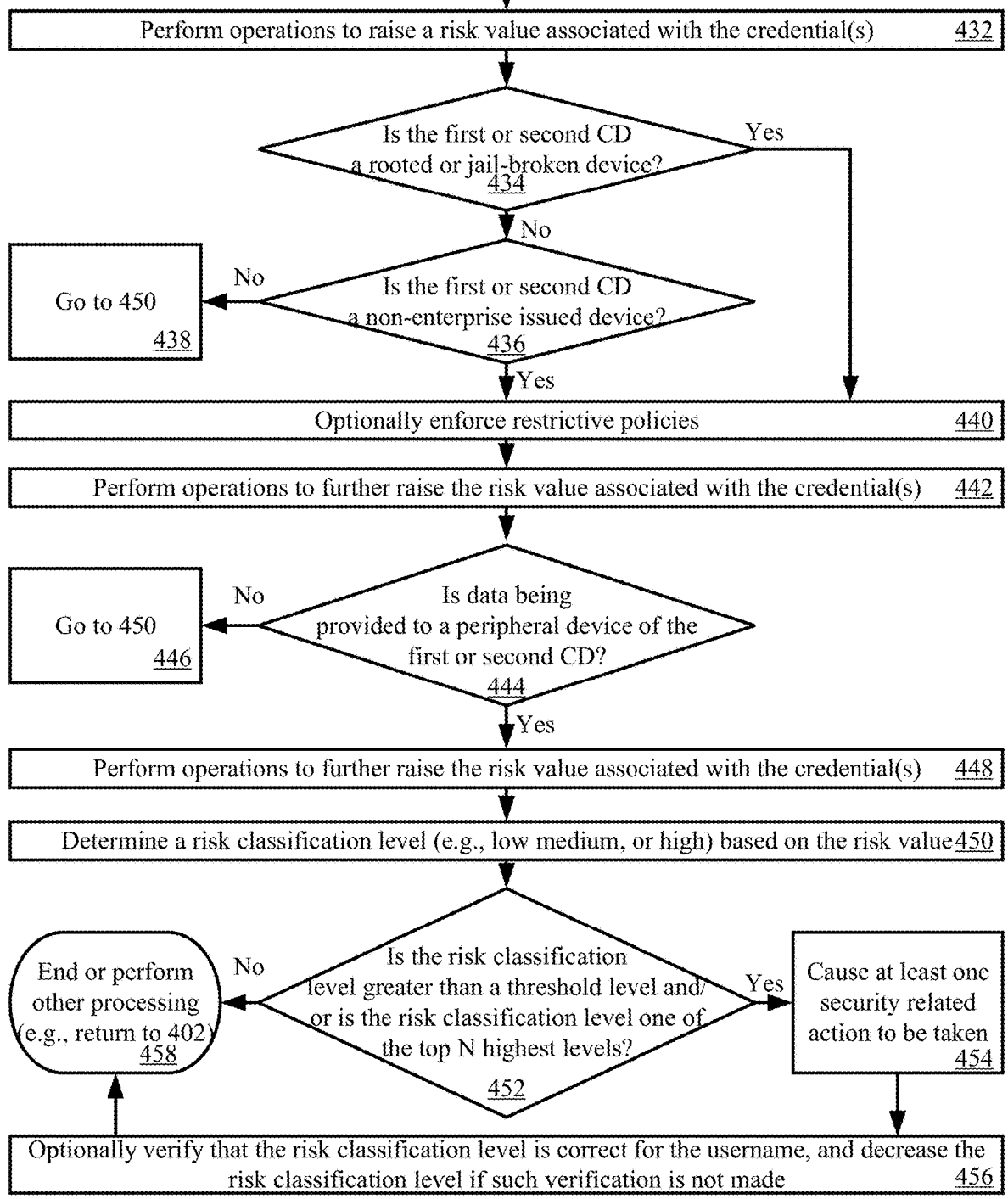

SYSTEMS AND METHODS FOR DETECTING AND THWARTING ATTACKS ON AN IT ENVIRONMENT

BACKGROUND

Statement of the Technical Field

The present disclosure relates generally to computing systems. More particularly, the present disclosure relates to implementing systems and methods for detecting and thwarting attacks on an Information Technology ("IT") environment.

Description of the Related Art

There are manner techniques for comprising the security of computing systems.
Many methods for thwarting such attacks on computing systems have been derived. However, these conventional methods are not desirably effective in certain scenarios.

SUMMARY

The present disclosure concerns implementing systems and methods for detecting and thwarting attacks on a computing system. The methods comprise collecting, by a first computing device (e.g., a server), timestamped data from a plurality of different software products. The plurality of different software products include, but are not limited to, a unified end point management product, a Server Based Computing ("SBC") and App and Desktop Virtualization ("ADV") product, an application delivery controller product, a content collaboration product, and/or a software defined wide area network product. The timestamped data can specify a newly observed user behavior, the second computing device's location, the second computing device's unique identifier, and/or a device type. The newly observed user behavior is defined by a type of network the second computing device is connecting from, a type of input device being used by a user of the second computing device, a type of user-software interaction, and/or a type of action caused by the user-software interaction.

The first computing device analyzes the collected timestamped data to determine if an observed user behavior matches a learned normal user behavior of an authorized user associated with a user account. A risk classification level is determined when the observed user behavior does not match the learned normal user behavior of the authorized user. The risk classification level is associated with a credential used by a user of a second computing device (e.g., a mobile phone or other client device) to log into the user account. At least one security related action is caused to be performed by the first computing device or the second computing device when the risk classification level is greater than a threshold level or the risk classification level is one of a top N (e.g., 5) highest risk classification levels.

In some scenarios, the analysis of the collected timestamped data involves increasing a numerical risk value when (a) the second computing device's unique identifier is a black listed or unusual unique identifier, (b) the credential is being used from two distant geographic locations at the same time, (c) the credential is being used again from a different geographic location within a given time period from a last use of the credential, (d) the second computing device is a rooted or jail-broken device, (d) the second computing device is a non-enterprise issued device, and/or (e) data is being provided to a peripheral device of the second computing device. The risk classification level is determined based on the numerical risk value.

The security related action includes, but is not limited to, disconnecting the second computing device from the enterprise system, presenting a multi-factor challenge to the user of the second computing device, disconnecting the session established with the second computing device, activating session recording for the second computing device, and/or alerting an administrator. Notably, another user's use of the credential to remain logged into the user account via a third computing device is unaffected by the security related action(s).

BRIEF DESCRIPTION OF THE DRAWINGS

The present solution will be described with reference to the following drawing figures, in which like numerals represent like items throughout the figures.

FIGS. 4A-4B (collectively referred to herein as "FIG. 4") is a flow diagram of an illustrative method for detecting and thwarting attacks on a computing system.

DETAILED DESCRIPTION

Figure 1:
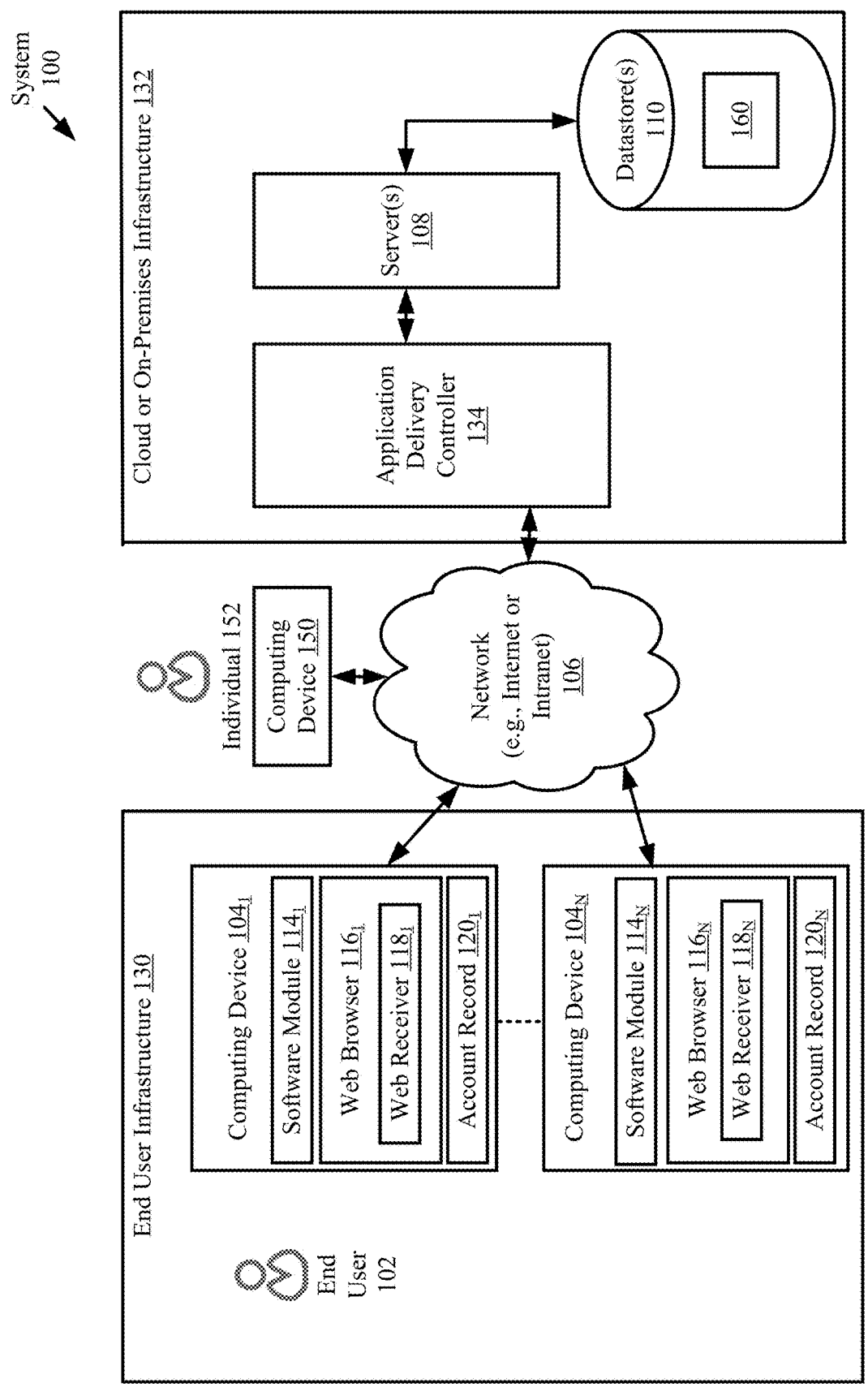
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present document concerns systems and methods for detecting and thwarting attacks on a computing system by an unauthorized individual who is using compromised login credentials of an authorized individual (e.g., via phishing). Data is collected from a plurality of software products. The collected data is used to differentiate a normal user behavior from a malicious attacker trying to steal data. Also, once a user credential is understood to be at a high risk, at least one action is triggered to thwart the malicious attack and increase the vigilance on other high risk user credentials.

The present solution has many novel features. The manner in which data is emitted by different software products is correlated to infer if user credentials are compromised. For example, the following operations are correlated with each other: a user login via a gateway; Global Positioning System ("GPS") from a client computing device; cloud-based remote application launches; user behavior for interacting with hosted applications; abnormal file copy using Universal Serial Bus ("USB") redirection; and abnormal file downloads via file sharing.

Although there exist conventional techniques for user risk scores, the present solution uses a unique combination of data and sequences of events to quantify a risk profile for a given username. The present solution has the ability to detect and take actions to thwart attacks on IT environments. These actions include, but are not limited to, sending alerts to administrators for further action; triggering session recordings; logging off users from hosted applications; and remotely wiping data from end user devices. This ability adds value to customers, such as business entities and end users.

Referring now to FIG. 1, there is provided an illustration of an illustrative system 100. System 100 implements methods for detecting and thwarting malicious attacks on computing devices. In this regard, system 100 comprises end user infrastructure 130 and cloud or on-premises infrastructure 132. The end user infrastructure 130 can be associated with a customer, such as a business organization (e.g., a hospital or real estate firm). The customer has a plurality of end users 102. Each end user can include, but is not limited to, an employee. Each end user 102 uses one or more Computing Devices ("CDs") $104_1, \ldots,$ or $104_N$ for a variety of purposes, such as accessing and using software programs made available via cloud services provided by a cloud service provider. In this regard, each of the CDs $104_1$-$104_N$ includes, but is not limited to, a smart phone, a smart watch, a portable computer, a personal digital assistant, a tablet computer, a desktop computer, and/or laptop computer. The CDs $104_1$-$104_N$ are configured to facilitate access to applications and virtual desktops without interruptions resulting from connectivity loss. Accordingly, the CDs $104_1$-$104_N$ have installed thereon and execute various software applications. These software applications include, but are not limited to, Web Browsers $116_1$-$116_N$, Web Receivers $118_1$-$118_N$, electronic mail applications, and/or editor applications. Each of the listed types of applications are well known in the art, and therefore will not be described herein. Any known or to be known software application can be used herein without limitation.

In some scenarios, the Web Receivers $118_1$-$118_N$ can respectively include, but are not limited to, Citrix Receivers available from Citrix Systems, Inc. of Florida and Citrix Receivers for a web site available from Citrix Systems, Inc. of Florida. Citrix Receivers comprise client software that is required to access applications and full desktops hosted by servers remote from client devices (e.g., CDs). The present solution is not limited in this regard.

The CDs $104_1$-$104_N$ also have various information stored internally. This information includes, but is not limited to, account records $120_1$-$120_N$. The CDs $104_1$-$104_N$ are able to communicate with each other via an Intranet and with external devices via the Internet. The Intranet and Internet are shown in FIG. 1 as a network 106.

The external devices include one or more application delivery controllers 134 and/or servers 108 located remotely from the CDs (e.g., at a cloud service provider facility). Application delivery controllers are well known in the art, and therefore will not be described herein. The server(s) 108 is(are) configured to facilitate access to applications and virtual desktops without interruptions resulting from connectivity loss. Accordingly, the server 108 has installed thereon and executes various software applications. The software applications include, but are not limited to, a StoreFront and a Desktop Delivery Controller ("DDC"). StoreFronts and DDCs are well known in the art, and therefore will not be described herein. Any known or to be known StoreFront and/or DDC can be employed herein.

The server 108 is also configured to access the datastore 110 in which various information 160 is stored, and is also able to write data to and read data from the datastore(s) 110. The various information 160 includes, but is not limited to, software applications, code, media content (e.g., text, images, videos, etc.), user account information, user authentication information (e.g., a user name and/or facial feature information), machine learning algorithms, and/or machine learning models.

During operation, an unauthorized individual 152 surreptitiously obtains credentials of an end user 102 (e.g., an employee). The individual 152 tries to access an enterprise environment using the compromised credentials in order to steal sensitive and confidential information from the enterprise. The individual 152 logs into the enterprise environment using a computing device 150 located at location A (e.g., Romania) and accesses at least one secure software product. The individual 152 then causes data to be downloaded to a USB drive of the computing device 150.

The end user 102 is unaware of this identity theft. The end user 102 is online from a customer site located at location B (e.g., Brazil) at the same time as the unauthorized individual 152. The end user 102 is simultaneously accessing enterprise resources using the compromised login credentials.

The present solution provides a way to differentiate the two users 102, 152 and prevent the malicious attack on the enterprise environment. In this regard, the present solution uses data from a plurality of software products to sense the malicious attack and systematically raise a user-risk profile based on triggers from across the software products.

As noted above, the unauthorized individual 152 is located at location A (e.g., Romania) while the end user 102 is located at location B (e.g., Brazil). When both individuals access the same software product (e.g., a secure mail) at the same time, the computing devices' 150, 104₁ locations are tracked by a remote server 108. The computing devices' 150, 104₁ locations are tracked based on GPS information and/or unique addresses of end points used by the end user 102 and the individual 152. Based on the tracked locations, the remote server 108 determines that the same user credential (e.g., username) is being used from two distant geographical locations with a given time period. If the tracked location information indicates that the distance between computing devices 150, 104₁ exceeds a threshold value (e.g., a difference in latitude >20°) within a given time period (e.g., an hour), then the server 108 raises the risk profile level or value associated with the user credential (e.g., username). The server 108 further raises the risk profile level or value associated with the user credential (e.g., username) if: the computing device 150 comprises a rooted or jail-broken device; the computing device 104₁ comprises a company-issued computing device and the computing device 150 comprises a non-company-issued computing device; and/or the computing device 150 performs operations to copy a given number of files to a USB drive connected thereto. Each time the risk profile level or value is increased, the server 108 causes certain actions to be taken. Alternatively or additionally, the server 108 causes certain security related actions to be taken when the risk profile level or value exceeds a threshold level or value.

Each user 102, 152 is classified into one of a plurality of risk categories (e.g., low, medium or high) based on his(her) behavior. A machine learning algorithm (e.g., a Support Vector Machine ("SVM") based algorithm) is employed here to learn behavior patterns associated with each risk category. Machine learning algorithms are well known in the art, and therefore will not be described herein. Any known or to be known machine learning algorithm can be used herein without limitation. The machine learning algorithm is trained with how to detect a series of events for a user, what weight each event carries, and how multiple of these events impact the risk. More specifically, the machine learning algorithm is trained with a list of triggers to classify the risk into each of the risk categories. For example, the following series of events triggers a risk classification of high: a logon from an unusual location followed by a copy over USB. The present solution is not limited to the particulars of this example.

The security related actions are performed in order to preempt or minimize damage from a malicious attack, raise vigilance, and/or provide alerts of possible malicious attacks (while the authorized user 102 continues to work with little or no interruption). As the risk profile threshold is breached, multiple actions are triggered to increase the security around the compromised credential (e.g., username). These actions include, but are not limited to: terminating active sessions; adding the compromised credential (e.g., username) to a special group that mandates multi-factor authentication of the end user(s) (e.g., via smart card technology or biometric based technology); alerting an administrator about the risk profile breach (e.g., via an email); prompting any end user using the compromised credential (e.g. username) to re-login using the multi-factor authentication; and/or activating session recording for the username and/or other risky users within the enterprise environment. Thus, by pooling data about events, check and hints from across different software products, the present solution is able to prevent any damage due to compromised credentials without disrupting the productivity of the actual authorized user 102.

Figure 2:
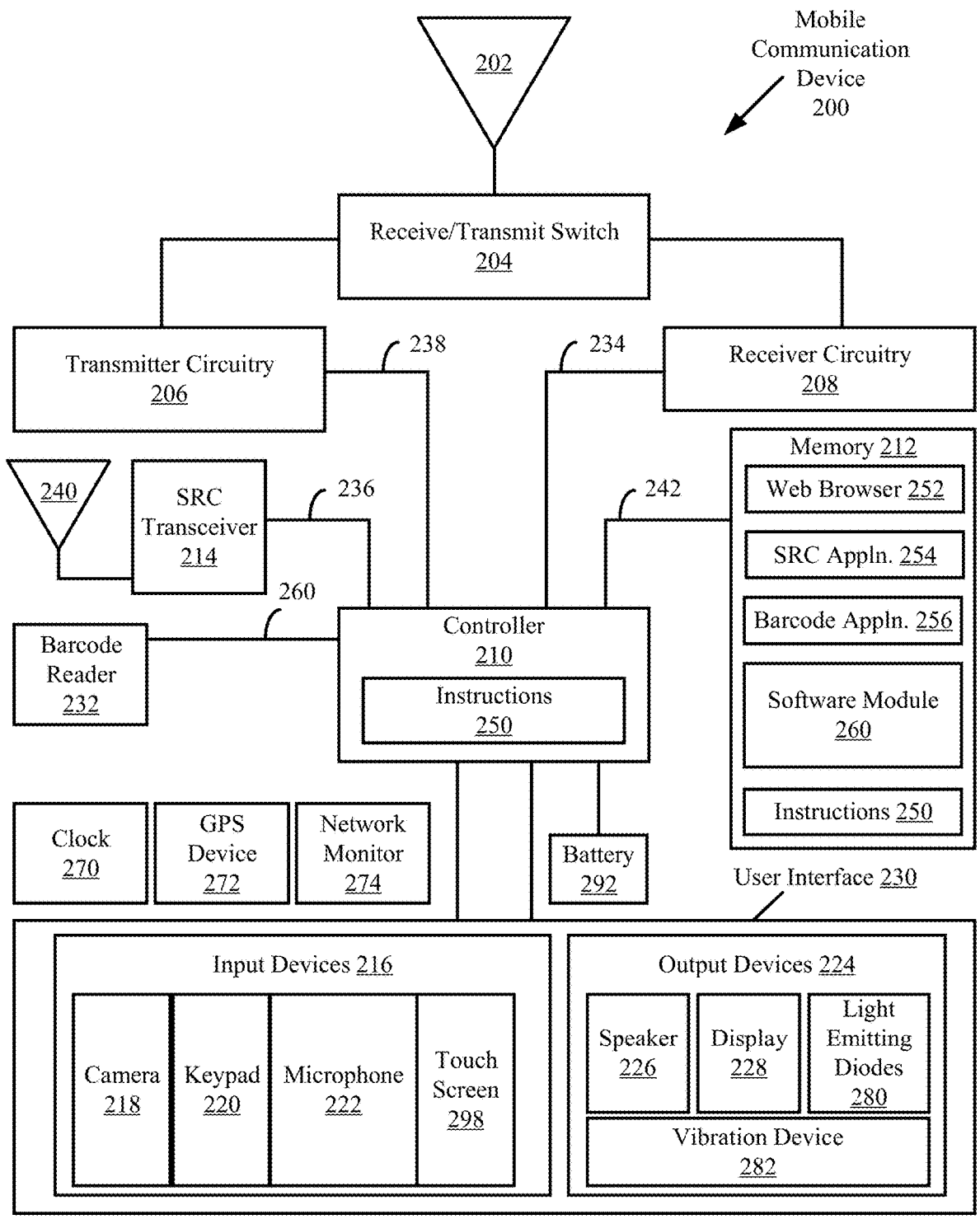
FIG. 2 is an illustration of an illustrative architecture for the mobile communication device shown in FIG. 1.

Referring now to FIG. 2, there is provided an illustration of an exemplary architecture for an Mobile Communication Device ("MCD") 200. CDs 104₁-104$_N$ and/or 150 of FIG. 1 can be the same as or similar to MCD 200. As such, the discussion of MCD 200 is sufficient for understanding CDs 104₁-104$_N$ and/or 150 of FIG. 1.

MCD 200 may include more or less components than those shown in FIG. 2. However, the components shown are sufficient to disclose an illustrative embodiment implementing the present solution. Some or all of the components of the MCD 200 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As noted above, the MCD 200 can include, but is not limited to, a notebook computer, a personal digital assistant, a cellular phone, a mobile phone with smart device functionality (e.g., a Smartphone), and/or a wearable device with smart device functionality (e.g., a smart watch). In this regard, the MCD 200 comprises an antenna 202 for receiving and transmitting Radio Frequency ("RF") signals. A receive/transmit ("Rx/Tx") switch 204 selectively couples the antenna 202 to the transmitter circuitry 206 and the receiver circuitry 208 in a manner familiar to those skilled in the art. The receiver circuitry 208 demodulates and decodes the RF signals received from an external device. The receiver circuitry 208 is coupled to a controller (or microprocessor) 210 via an electrical connection 234. The receiver circuitry 208 provides the decoded signal information to the controller 210. The controller 210 uses the decoded RF signal information in accordance with the function(s) of the MCD 200. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device via the Rx/Tx switch 204.

The MCD 200 also comprises an antenna 240 coupled to a Short Range Communications ("SRC") transceiver 214 for receiving SRC signals. SRC transceivers are well known in the art, and therefore will not be described in detail herein. However, it should be understood that the SRC transceiver 214 processes the SRC signals to extract information therefrom. The SRC transceiver 214 may process the SRC signals in a manner defined by the SRC application 254 installed on the MCD 200. The SRC application 254 can include, but is not limited to, a Commercial Off the Shelf ("COTS") application (e.g., a Bluetooth application). The SRC transceiver 214 is coupled to the controller 210 via an electrical connection 236. The controller uses the extracted information in accordance with the function(s) of the MCD 200.

The controller 210 may store received and extracted information in memory 212 of the MCD 200. Accordingly, the memory 212 is connected to and accessible by the controller 210 through electrical connection 242. The memory 212 may be a volatile memory and/or a non-volatile memory. For example, memory 212 can include, but is not limited to, a Random Access Memory ("RAM"), a Dynamic RAM ("DRAM"), a Read Only Memory ("ROM") and a flash memory. The memory 212 may also comprise unsecure memory and/or secure memory. The memory 212 can be used to store various other types of data 260 therein, such as authentication information, cryptographic information, location information, and various work order related information.

The MCD 200 also may comprise a barcode reader 232. Barcode readers are well known in the art, and therefore will not be described herein. However, it should be understood that the barcode reader 232 is generally configured to scan a barcode and process the scanned barcode to extract information therefrom. The barcode reader 232 may process the barcode in a manner defined by the barcode application 256 installed on the MCD 200. Additionally, the barcode scanning application can use camera 218 to capture the barcode image for processing. The barcode application 256 can include, but is not limited to, a COTS application. The barcode reader 232 provides the extracted information to the controller 210. As such, the barcode reader 232 is coupled to the controller 210 via an electrical connection 260. The controller 210 uses the extracted information in accordance with the function(s) of the MCD 200. For example, the extracted information can be used by MCD 200 to enable user authentication functionalities thereof.

As shown in FIG. 2, one or more sets of instructions 250 are stored in memory 212. The instructions may include customizable instructions and non-customizable instructions. The instructions 250 can also reside, completely or at least partially, within the controller 210 during execution thereof by MCD 200. In this regard, the memory 212 and the controller 210 can constitute machine-readable media. The term "machine-readable media", as used herein, refers to a single medium or multiple media that stores one or more sets of instructions 250. The term "machine-readable media", as used here, also refers to any medium that is capable of storing, encoding or carrying the set of instructions 250 for execution by the MCD 200 and that causes the MCD 200 to perform one or more of the methodologies of the present disclosure.

The controller 210 is also connected to a user interface 230. The user interface 230 comprises input devices 216, output devices 224 and software routines (not shown in FIG. 2) configured to allow a user to interact with and control software applications (e.g., software applications 252-256 and other software applications) installed on the MCD 200. Such input and output devices may include, but are not limited to, a display 228, a speaker 226, a keypad 220, a directional pad (not shown in FIG. 2), a directional knob (not shown in FIG. 2), a microphone 222, a touch screen 298, and a camera 218. The display 228 may be designed to accept touch screen inputs. As such, user interface 230 can facilitate a user software interaction for launching applications (e.g., applications 252-260 and other software applications) installed on the MCD 200. The user interface 230 can facilitate a user-software interactive session for: initiating communications with an external device; writing data to and reading data from memory 212; and/or initiating user authentication operations for authenticating a user (e.g., such that a remote session between a nearby client computing device and a remote cloud service server).

The display 228, keypad 220, directional pad (not shown in FIG. 2) and directional knob (not shown in FIG. 2) can collectively provide a user with a means to initiate one or more software applications or functions of the MCD 200. The application software 252-260 can facilitate the data exchange between (a) a user and the MCD 200, and/or (b) the MCD 200 and another device. In this regard, the application software 252-260 performs one or more of the following: facilitate verification of that the user of the MCD 200 is an authorized user via a one-factor or a multi-factor authentication process; present information to the user indicating that (s)he is or is not authorized to use the resource; and/or perform actions to prevent any damage to an enterprise system due to compromised user credentials (e.g., a username).

Figure 3:
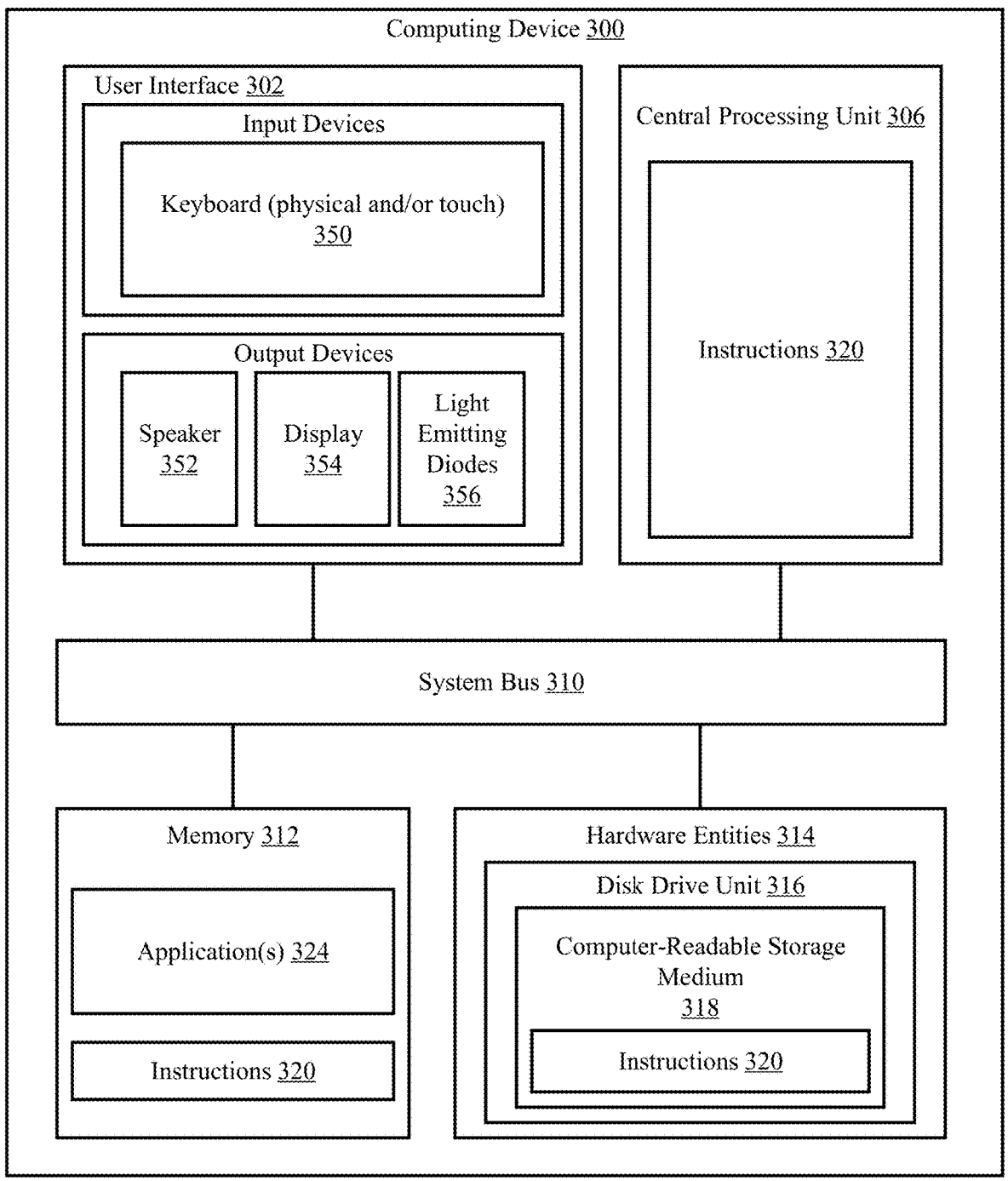
FIG. 3 is an illustration of an illustrative architecture for a computing device.

Referring now to FIG. 3, there is provided an illustration of an exemplary architecture for a computing device 300. CDs $104_1$-$104_N$, 152 and/or server(s) 108 of FIG. 1 (is)are the same as or similar to server 300. As such, the discussion of computing device 300 is sufficient for understanding these components of system 100.

Computing device 300 may include more or less components than those shown in FIG. 3. However, the components shown are sufficient to disclose an illustrative solution implementing the present solution. The hardware architecture of FIG. 3 represents one implementation of a representative computing device configured to enable watermarking of graphics, as described herein. As such, the computing device 300 of FIG. 3 implements at least a portion of the method(s) described herein.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices and output devices, which facilitate user-software interactions for controlling operations of the computing device 300. The input devices include, but are not limited, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Referring now to FIG. 4, there is shown a flow diagram of an illustrative method 400 for detecting and thwarting attacks on a computing system. Method 400 comprises a plurality of blocks. The present solution is not limited to the order of the blocks shown in FIG. 4. The operations of the blocks can be performed in a different order (than that shown) in accordance with a given application. For example, blocks 410-416 are shown as being performed in parallel with or at the same time as blocks 404-408. The present solution is not limited in this regard. Blocks 410-416 can be performed within a given time period from the last use of resources accessed using the user account (e.g., a logging out of the user account upon completion of 408).

As shown in FIG. 4A, method 400 begins with 402 and continues with 404-408. 404 involves receiving by a first CD (e.g., CD $104_1$ of FIG. 1) a first user-software interaction for logging into a user account using at least one credential. For example, the user of the first CD uses a username (e.g., asmith) and/or a password (e.g., $work123) to log into a user account. The present solution is not limited to the particulars of this example. The first user-software interaction can be achieved using an input device (e.g., input device 216 of FIG. 2 or input device 350 of FIG. 3) of the first CD.

Once logged into the user account, the user of the first CD is allowed access to enterprise resources (e.g., a secure mail software program), as shown by 406. First timestamped data is collected in 408 that specifies newly observed user behavior, the first CD's location (e.g., a company building in Brazil), the first CD's unique identifier (e.g., IP address), and/or a device type (e.g., a company issued device). The user behavior data can include but is not limited to, data indicating which type of network the first CD is connecting from, data indicating the type of input device (e.g., a mouse, touch screen or keyboard) being used by the user, data indicating the type is user-software interaction (e.g., keyboard stroke mouse click, swipe gesture, etc.), and/or data indicating the type of action caused by the user-software interaction (e.g., file transfer, file share, print, download, scanning, etc.). The collected first timestamped data may be communicated to a remote server (e.g., server 108 of FIG. 1 for processing and/or storage in a datastore 110 of FIG. 1).

All or some of the operations of blocks 410-416 are performed at the same time as 404-408 or within a given time period from the first CD's user logging out of the user account (which can occur in block 408). 410 involves receiving by a second CD (e.g., CD 150 of FIG. 1) a second user-software interaction for logging into the user account using the credential(s) which has(have) been compromised. As noted above, the credential(s) can include, but is(are) not limited to, a username and/or a password. The second user-software interaction can be achieved using an input device (e.g., input device 216 of FIG. 2 or input device 350 of FIG. 3) of the second CD. In optional 414, data is downloaded to a peripheral device (e.g., a USB drive, a printer, a scanner, etc.) coupled to the second CD. Second timestamped data is collected in 416 that specifies a newly observed user behavior, the second CD's location (e.g., a home in Romania), the second CD's unique identifier (e.g., IP address), and/or a device type (e.g., a rooted/jail-broken device and/or a non-company issued device). The user behavior data can include, but is not limited to, data indicating which type of network the second CD is connecting from, data indicating the type of input device (e.g., a mouse, touch screen or keyboard) being used by the user, data indicating the type is user-software interaction (e.g., keyboard stoke, mouse click, swipe gesture, etc.), and/or data indicating the type of action caused by the user-software interaction (e.g., file transfer, file share, print, download, scanning, etc.). The collected second timestamped data may be communicated to a remote server (e.g., server 108 of FIG. 1 for processing and/or storage in a datastore 110 of FIG. 1).

Notably, the first and second timestamped data is collected using a plurality of different software programs or products. The different software programs or products include, but are not limited to, a unified end point management product (e.g., XenMobile available from Citrix of Fort Lauderdale, Fla.), an SBC/ADV product (e.g., XenApp and XenDesktop available from Citrix of Fort Lauderdale, Fla.), an application delivery controller product (e.g., Netscaler or Netscaler Gateway available from Citrix of Fort Lauderdale, Fla.), a content collaboration product (e.g., ShareFile available from Citrix of Fort Lauderdale, Fla.), and/or a software defined wide area network product (e.g., NetScaler SD-WAN available from Citrix of Fort Lauderdale, Fla.).

Subsequently in 418, the first and second timestamped data is analyzed, for example, by a remote server (e.g., server 108 of FIG. 1) using a machine learning algorithm. Machine learning algorithms are well known in the art, and therefore will not be described in detail herein. Any known or to be known machine learning algorithm can be used herein. For example, a binary classification based machine learning algorithm and/or a clustering based machine learning algorithm is(are) employed here. The machine learning algorithm(s) is(are) stored in a location memory (e.g., memory 312 of FIG. 3) of the server or in a remote datastore (e.g., datastore 110 of FIG. 1).

The machine learning algorithm is trained with normal behavior patterns for an authorized user associated with the user account, as well as abnormal behavior patterns suggesting that the enterprise system may be at risk of a malicious attack. The analysis is performed to detect when abnormal behavior is occurring that requires a security related action to be performed to protect an enterprise system from a malicious attack. In this regard, the analysis involves determining if certain criteria or criterion is(are) met that puts the security of an enterprise system at risk from malicious attacks. In the latter case, each criteria has a particular weight assigned thereto so that two or more of the criterion are not considered with the same level of importance when determining a risk classification level for the credential(s). The criterion include, but are not limited to, type of user behavior, the deviation of newly observed user behavior from known normal user behavior, type of traffic between an end user device and a server, end user device locations, time of user account logins/logouts, distance between two devices used to simultaneously or sequentially access resources via the same credential(s), and/or the type of devices used to simultaneously or sequentially access resources via the same credential(s).

In some scenarios, the analysis is performed to: (a) determine if the user behavior associated with the first CD and/or second CD match(es) a learned normal user behavior for an authorized user associated with the user account, (b) determine if the first or second CD's unique identifier is a black listed unique identifier or an unusual unique identifier, (c) determine if the same credential(s) (e.g., username and/or password) is(are) being used from two distant geographic locations at the same time, and/or (d) determine whether the credential(s) is(are) being used again from a different geographic location within a given time period from the last use.

The learned normal user behavior is made of multiple components with one of those being the pattern the machine learning training model has built from how the user uses the device (e.g., swipes, typing, etc.). Another component of the learned normal user behavior is the location and time of day (and days of the week) the user normally uses a particular device. Other components are combined when determining what is a normal place and time of usage. For example, a typical normal user behavior can be a user who uses a particular device (1) from an office location on non-holiday weekdays during the daytime hours, (2) from home during evenings, weekends and/or holidays. In this case, the place and time components are combined in the determination of normal user behavior relating to those components.

If the user behavior matches a learned normal user behavior [420:YES], then 422 is performed where method 400 continues with 450 of FIG. 4B. 450 generally involves determining a risk classification level (e.g., low, medium, or high) associated with the credentials. The risk classification level can be obtained from a datastore (e.g., datastore 110 of FIG. 1). 450 and the following operations thereof will be described in detail below.

If the user behavior does not match learned normal user behavior [420:NO], then method 400 continues with 424. If at least one of the first and second CD's unique identifier is a black listed or unusual unique identifier [424:YES], then method 400 continues with 432 of FIG. 4B so that a risk level value associated with the credential(s) is raised by a first amount. If neither of the first and second CD's unique identifier is a black listed or unusual unique identifier [424:NO], then method 400 continues with 426.

If the credential(s) is(are) being used from two distant geographic locations at the same time [426:YES], then method 400 continues with 432 of FIG. 4B so that a risk level value associated with the credential(s) is raised by a second amount (which is the same or different than the first amount). If the credential(s) is(are) not being used from two distant geographic locations at the same time [426:NO], then method 400 continues with 428.

If the credential(s) is(are) not being used again from a different geographic location within a given time period from the last use [428:NO], then 422 is performed where method 400 continues with 450 of FIG. 4B. 450 generally involves determining a risk classification level (e.g., low, medium, or high) associated with the credentials. The risk classification level can be obtained from a datastore (e.g., datastore 110 of FIG. 1). 450 and the following operations thereof will be described in detail below.

If the credential(s) is(are) being used again from a different geographic location within a given time period (e.g., 1 hour) from the last use [428:YES], then 430 is performed to determine if the distance between the two different geographic locations exceeds a threshold distance (e.g., 1500 miles). If not [430:NO], then 422 is performed where method 400 continues with 450 of FIG. 4B so that a risk classification level (e.g., low, medium, or high) associated with the credentials is obtained. If so [430:YES], then method 400 continues with 432 of FIG. 4B. As shown in FIG. 4B, 432 involves performing operations to raise a risk value associated with the credential(s) by a third amount (where the third amount is the same as or different than the first and/or second amount).

In some scenarios, the risk value comprises a decimal number or an integer number. The decimal or integer number can be incremented when a criteria is met as described above. Each criteria can trigger an increment by an amount that is the same as or different than that triggered by another criteria. For example, the risk value is incremented by a first amount when the first or second CD's unique identifier is a black listed unique identifier, a second amount when the credential(s) are being used from two distant geographic locations at the same time, and a third amount when the credentials are being used again from a different geographic location within a given time period from the last use and the distance between the different geographic locations exceed a threshold distance. The first, second and third amounts are the same or different. The present solution is not limited by the particulars of this example.

After 432, 434 is performed to determine if the first or second CD is a rooted or jail-broken device. The term "rooted device", as used herein, refers to an Android based device with an unlocked operating system that allows the removal of software restrictions imposed by an enterprise, unapproved applications to be installed thereon, and/or approved applications to be replaced and/or deleted. The term "jail-broken device, as used herein, refers to an iPhone or iPad with an unlocked operating system that allows the removal of software restrictions imposed by an enterprise, unapproved applications to be installed thereon, and/or approved applications to be replaced and/or deleted.

If so [434:YES], method 400 continues with 440 which will be discussed below. If not [434:NO], 436 is performed where a determination is made as to whether the first or second CD is a non-enterprise issued device. If not [436:NO], then 438 is performed where method 400 continues to 450, which will be discussed below. If so [436:YES], then method continues with optional 440 where restrictive policies are enforced. Next in 442, operations are performed to further raise the risk value associated with the credential(s) by a fourth amount (which is the same as or different than the first, second and/or third amount(s)).

Subsequently, 444 is performed to determine if data is being provided to a peripheral device of the first or second CD. If not [444:NO], then 446 is performed where method 400 continues to 450, which will be discussed below. If so [444:YES], then 448 is performed where the risk value is further raised by a fifth amount (which is the same as or different than the first, second and/or third amount(s)).

Upon competing 448, 450 is performed where a risk classification level (e.g., low, medium or high) is determined based on the risk value. For example, a low risk classification level is assigned to the credential(s) when the risk value is between 0 and 10, a medium classification level is assigned to the credential(s) when the risk value is between 10 and 20, and a high classification level is assigned to the credential(s) when the risk value is greater than 20. The present solution is not limited to the particulars of this example.

In 452, the risk classification level is analyzed to determine if it is greater than a threshold level (e.g., a low or medium level) and/or is one of the top N (e.g., 5) highest levels for a given set of credential(s). If so [452:YES], then at least one security related action is taken in 454. The security related action can include, but is not limited to, disconnecting the first and/or second CD from the enterprise system, presenting a multi-factor challenge to the user of the first and/or second CD, disconnect the session established with the first and/or second CD, activate session recording for any device logged in using the credential(s), and/or alerting an administrator. In the case that the administrator is alerted, method 400 may continue with optional 456. 456 involves verifying that the risk classification level is correct for the username, and decrease the risk classification level if such verification is not made. Subsequently, 458 is performed where method 400 ends or other processing is performed (e.g., return to 402 of FIG. 4A).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for detecting and thwarting attacks on a computing system, comprising:
    collecting, by a first computing device, timestamped data from a plurality of different software products comprising at least two of a unified end point management product, a Server Based Computing ("SBC") and App and Desktop Virtualization ("ADV") product, an application delivery controller product, a content collaboration product, and a software defined wide area network product;
    analyzing, by the first computing device, the collected timestamped data to determine if an observed user behavior matches a learned normal user behavior of an authorized user associated with a user account;
    in response to the observed user behavior not matching the learned normal user behavior of the authorized user, triggering a first increase to a risk value associated with a credential used by a user of a second computing device to log into the user account when a first criteria is met;
    triggering a second increase of the risk value when a second criteria is met, the second criteria being different from the first criteria;
    determining an updated risk classification level which is based on both the first and second increase; and
    causing at least one security related action to be performed by the first computing device or the second computing device when the risk classification level is greater than a threshold level or the risk classification level is one of a top N highest risk classification levels.

2. The method according to claim 1, wherein the timestamped data specifies at least one of a newly observed user behavior, the second computing device's location, the second computing device's unique identifier, and a device type.

3. The method according to claim 2, wherein the newly observed user behavior is defined by at least one of a type of network the second computing device is connecting from, a type of input device being used by a user of the second computing device, a type of user-software interaction, and a type of action caused by the user-software interaction.

4. The method according to claim 1, wherein the second criteria is met when the credential is being used from two distant geographic locations at the same time.

5. The method according to claim 1, wherein the second criteria is met when the second computing device is a non-enterprise issued device.

6. The method according to claim 1, wherein the second criteria is met when data is being provided to a peripheral device of the second computing device.

7. The method according to claim 1, wherein the at least one security related action further comprises at least one of disconnecting the second computing device from the enterprise system, presenting a multi-factor challenge to the user of the second computing device, disconnecting the session established with the second computing device, activating session recording for the second computing device, and remotely causing data to be deleted from the second computing device.

8. The method according to claim 1, wherein the at least one security related action comprises terminating access to the user account from the second computing device while another use of the credential to remain logged into the user account via a third computing device is unaffected by the at least one security related action.

9. The method according to claim 1, wherein the first criteria is met when, based on the analyzing, at least one of the following is determined: (i) the second computing device identifier is blacklisted or unusual, (ii) the credential is being used from two distant geographic locations at the same time, or (iii) the credential is being used again from a different geographic location within a given time period from a last use of the credential.

10. A system, comprising:
    a processor; and
    a non-transitory computer-readable storage medium comprising programming instructions that are configured to cause the processor to implement a method for detecting and thwarting attacks on the system, wherein the programming instructions comprise instructions to:
        collect timestamped data from a plurality of different software products comprising at least two of a unified end point management product, a Server Based Computing ("SBC") and App and Desktop Virtualization ("ADV") product, an application delivery controller product, a content collaboration product, and a software defined wide area network product;
        analyze the collected timestamped data to determine if an observed user behavior matches a learned normal user behavior of an authorized user associated with a user account;
        determine a risk classification level associated with a credential used by a user of a computing device to log into the user account, when a first criteria is met, the first criteria being met when the observed user behavior does not match the learned normal user behavior of the authorized user;
        trigger a first increase to a risk value associated with a credential used by a user of a second computing device to log into the user account when a first criteria is met;
        trigger a second increase of the risk value when a second criteria is met, the second criteria being different from the first criteria;
        determine a risk classification level which is based on both the first and second increase; and
        cause at least one security related action to be performed by the system or the computing device when the risk classification level is greater than a threshold level or the risk classification level is one of a top N highest risk classification levels.

11. The system according to claim 10, wherein the time-stamped data specifies at least one of a newly observed user behavior, the computing device's location, the computing device's unique identifier, and a device type.

12. The system according to claim 11, wherein the newly observed user behavior is defined by at least one of a type of network the computing device is connecting from, a type of input device being used by a user of the computing device, a type of user-software interaction, and a type of action caused by the user-software interaction.

13. The system according to claim 10, wherein the second criteria is met when the credential is being used from two distant geographic locations at the same time.

14. The system according to claim 10, the second criteria is met when the credential is being used again from a different geographic location within a given time period from a last use of the credential.

15. The system according to claim 10, wherein the second criteria is met when data is being provided to a peripheral device of the computing device.

\* \* \* \* \*